United States Patent

[11] 3,607,445

[72] Inventor Frank F. Hines
Litchfield, N.H.
[21] Appl. No. 706,585
[22] Filed Feb. 19, 1968
[45] Patented Sept. 21, 1971
[73] Assignee RdF Corporation
Hudson, N.H.

[54] THERMAL APPARATUS
3 Claims, 6 Drawing Figs.

[52] U.S. Cl. .......... 136/225, 136/227
[51] Int. Cl. .......... H01v 1/02
[50] Field of Search .......... 136/225, 226, 227

[56] References Cited

UNITED STATES PATENTS

| | | | |
|---|---|---|---|
| 1,526,641 | 2/1925 | Mulvany et al. | 136/227 |
| 1,638,943 | 8/1927 | Little | 136/225 X |
| 2,378,804 | 6/1945 | Sparrow et al. | 136/225 |
| 2,381,819 | 8/1945 | Graves et al. | 136/225 |
| 2,519,785 | 8/1950 | Okolicsanyi | 136/225 X |
| 2,629,757 | 2/1953 | McKay | 136/225 X |
| 2,694,098 | 11/1954 | Leins | 136/225 |
| 2,798,494 | 7/1957 | Sukacev | 136/225 X |
| 3,099,575 | 7/1963 | Hill | 136/225 X |
| 1,528,383 | 3/1925 | Schmidt | 136/226 |
| 2,337,000 | 12/1943 | Ray | 136/227 |
| 2,807,657 | 9/1957 | Jenkins et al. | 136/226 X |
| 2,813,425 | 11/1957 | Woolley | 136/226 |
| 3,427,209 | 2/1969 | Hager, Jr. | 136/225 |

*Primary Examiner*—Carl D. Quarforth
*Assistant Examiner*—Harvey E. Behrend
*Attorney*—Chittick, Pfund, Birch, Samuels & Gauthier

ABSTRACT: A thermal apparatus having *n*, unitary, planar, thermoelectric elements arranged to produce *n*—1 thermoelectric junctions where the number of elements "*n*" is an odd number of five or more. The thermoelectric junctions can be arranged in series, parallel, or combinational configurations. Various geometries are used to produce substantially planar thermopiles having a very high junction density per unit area.

INVENTOR.
FRANK F. HINES
BY
Russell, Chittick & Pfund

INVENTOR.
FRANK F. HINES
BY
Russell, Chittick & Pfund

THERMAL APPARATUS

BACKGROUND OF THE INVENTION

Recent developments in the thermal measuring and sensing field have demonstrated the feasibility of using very thin metallic foils of dissimilar thermoelectric materials to form a thermoelectric junction. A heat meter comprising two thermoelectric junctions formed from edge-welded copper-constantan foil material and separated by a thin wafer of low density, compression resistant, thermal insulation has been described in the literature; N. E. Hager, Jr., "Thin Foil Heat Meter" *The Review of Scientific Instruments*, Vol. 36, No. 11, Nov. 1965. Further information on thin foil construction techniques which are applicable to thermal instrumentations can be found in U.S. Pat. applications, Ser Nos. 456,700 and 483,738 entitled respectively "Quick-Response, Heat-Sensing Element" and "Temperature-Sensing Probe" filed by Nathaniel E. Hager, Jr. The latter application was issued on Nov. 28, 1967 as U.S. Pat. No. 3,354,720.

The use of multiple, thermoelectric junctions connected in series, parallel or combinational configurations is also well known in the thermal instrumentation art. For instance, a plurality of thermoelectric junctions at the same thermal level can be employed to determine temperature when referenced to a known temperature. The same type of thermoelectric junctions can also be used to measure heat flow. If the thermoelectric junctions are series connected and positioned at different thermal levels, the resulting thermoelectric e.m.f. will be a function of the heat flow across the thermal barrier between the junctions.

If the recent thin foil construction techniques were applied to conventional thermoelectric junction instruments, such as, plural differential thermocouples and thermopiles, significant improvements can be achieved in terms of thermal sensor response time, thermoelectric junction density per sensor unit area and the sensor-packaging configuration.

It is accordingly a general object of the present invention to provide a plural junction, thermoelectric apparatus which utilizes thin foil construction techniques.

It is a specific object of the present invention to provide a plural junction, thermoelectric apparatus having *n*, unitary, planar, thermoelectric elements which are arranged to produce $n-1$ thermoelectric junctions where "*n*" is an odd number of five or more.

It is a feature of the invention that the unitary, planar, thermoelectric elements can be integrally fabricated by conventional methods and easily assembled into the desired plurality of thermoelectric junctions.

It is another object of the invention to provide a plural thermoelectric junction heat flow sensor by single, flat folding each planar, unitary thermoelectric element around a sheet material which provides a thermal barrier between electrically alternating thermoelectric junctions.

It is another feature of the present invention that the resulting folded, heat flow sensor is substantially planar in form and provides an extremely low packaging profile.

These objects and other objects and features of the present invention will best be understood from a detailed description of the preferred embodiments thereof, selected for purposes of illustration and shown in the accompanying drawings in which.

Figure 6:
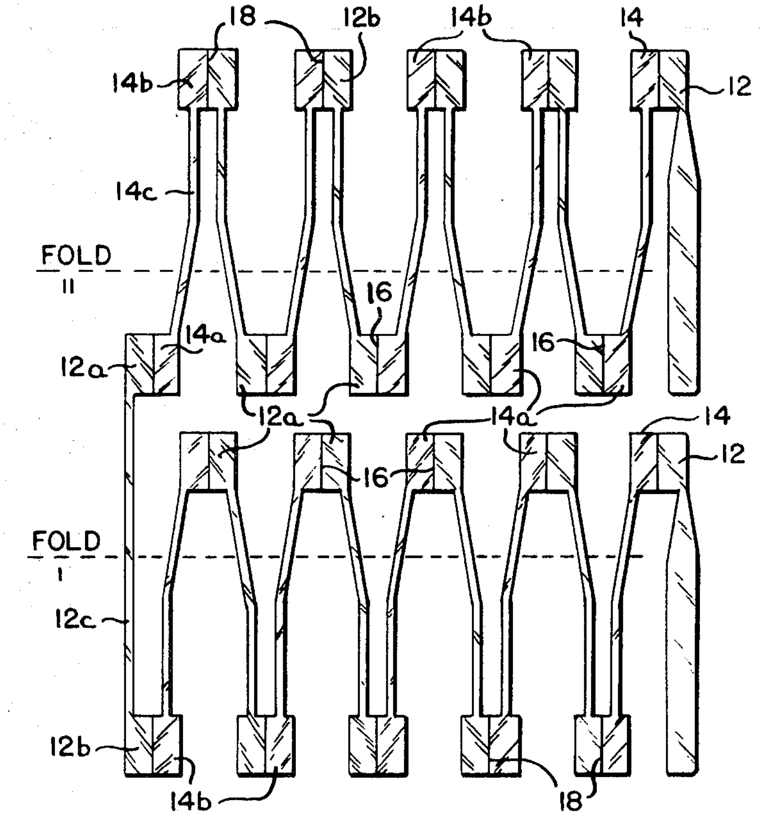
Figure 5:
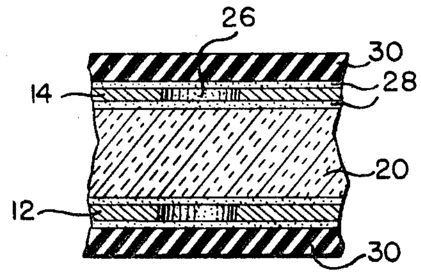

FIG. 5 is a view in cross section of a portion of the assembled thermal apparatus showing the central thermal barrier, the folded thermoelectric elements adhesively bonded to the thermal barrier and outer electrically insulating protective members; and FIG. 6 is a plan view of an alternate embodiment of the invention having 20 thermoelectric junctions which are arranged to form 10 differential thermocouples.

Figure 1:
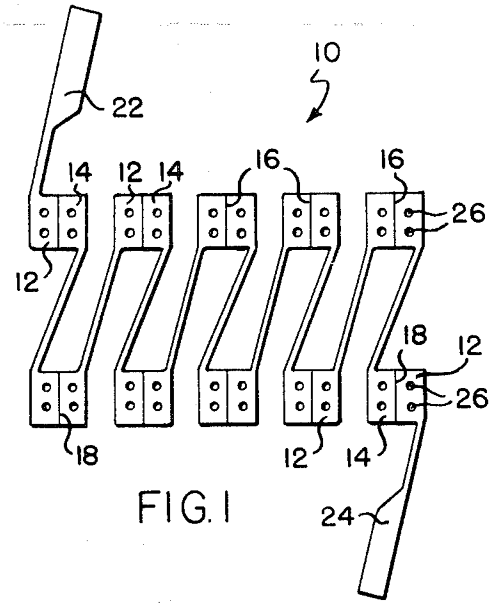
FIG. 1 is a plan view of a 10-junction thermal apparatus shown in its flat, prefolded state.

Turning now to the drawings, and particularly to FIG. 1 thereof, there is shown in plan view a plural junction, thermoelectric apparatus constructed in accordance with the present invention and indicated generally by the reference numeral 10. The apparatus 10 comprises alternating, unitary, planar thermoelectric elements 12 and 14 which are formed from dissimilar materials in the thermoelectric series.

In the preferred embodiment of the present invention copper and constantan are used for the thermoelectric elements 12 and 14, respectively. Other thermoelectric materials and different combinations thereof, such as, for example, iron and constantan can be used. It is also possible to construct the thermal apparatus of the present invention with a combination of more than two dissimilar thermoelectric materials.

Figure 2:
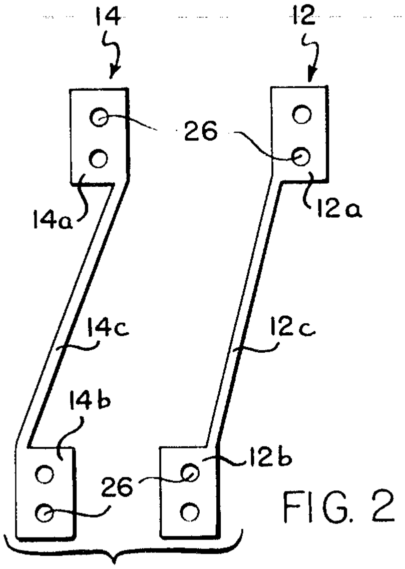
FIG. 2 is an enlarged plan view of two of the unitary, planar, thermoelectric elements of the thermal apparatus illustrated in FIG. 1.
Figure 3:
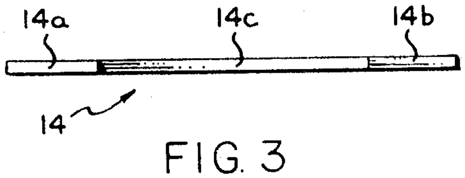
FIG. 3 is a side elevation of one of the thermoelectric elements shown in FIG. 2.

The thermoelectric elements 12 and 14 which are arranged to form the desired number of thermoelectric junctions are shown in enlarged plan view and in side elevation in FIGS. 2 and 3, respectively. Each thermoelectric element is characterized by a planar, unitary construction. The term "untiary," as used herein, means that each element is a single, continuous material without any joints, welds or other connections between individual components. The thermoelectric elements 12 and 14 are integrally formed from the selected thermoelectric material in sheet form by conventional fabricating techniques including cutting and acid etching. Alternatively, the thermoelectric elements can be vapor deposited on a suitable substrate. It is also possible to use electrically conductive paints and powdered thermoelectric materials in a binder. However, regardless of the particular method employed to produce the thermoelectric elements, it is important to note that the elements are both unitary and planar.

Referring to FIGS. 1, 2 and 3, it can be seen that each unitary thermoelectric element 12 has three portions: a first thermoelectric portion **12*a* which, together with the corresponding first thermoelectric portion 14*a* of element 14, forms a thermoelectric junction 16; a second thermoelectric portion 12*b* which forms another thermoelectric junction 18 together with thermoelectric portion 14*b*: and an intermediate connection portion 12*c*. The corresponding connecting portion for thermoelectric element 14 is identified by the reference number 14*c***.

The thermoelectric junctions 16 and 18 are formed from the physical contact between the dissimilar end portions **12*a*–14 and 12*b*–14*b*, respectively. Preferably, the thermoelectric portions 12*a*–14*a* and 12*b*–14*b* are butted together and edge welded to produce a low-resistance thermoelectric junction. However, other joining methods can be employed to form the junction. For example, a small section of each end portion 12*a*–14*a* and 12*b*–14*b*** can be overlapped and spot welded together.

If the thermoelectric elements 12 and 14 are edge welded together, the resulting structure, as shown in FIGS. 1 through 3, will be substantially planar and, when folded around a suitable thermal barrier 20 (FIG. 4), will provide an extremely low packaging profile. The relative thinness of each thermoelectric element permits a very rapid response time for the thermal apparatus 10. Typical dimensions using copper and constantan metal foils are as follows: foil thickness, 0.0002 inch–0.0005 inch; area of each end portion **12*a*–14*a* and 12*b*–14*bq*, 0.01 to 0.0001 square inch; thermal barrier 20** thickness, 0.002 inch–0.010 inch. The substantially planar configuration of the structure will be apparent when one considers that the length of the folded junctions, as indicated by the letter "*a*" in FIG. 4, is one-half inch.

A number of different materials having a relatively high thermal resistance can be used for the thermal barrier 20. High-temperature polymers or laminates are suitable. The polyimides, such as Amoco AI polymer or DuPont "KAPTON" film, can be used to provide the thermal barrier between the electrically alternating thermoelectric junctions 16 and 18. Glass silicon laminates and various ceramics are also suitable materials for the barrier 20.

It will be appreciated that the physical configuration of the thermal barrier 20 can take a variety of forms. Preferably, the barrier 20 has at least one straight edge around which each connecting portion 12*c* and 14*c* is folded in a single, flat fold without twisting. By utilizing unitary thermoelectric elements, it is possible to form a plurality of thermoelectric junctions and, hence a plurality of differential thermocouples connected as a thermopile in a single folding operation. This arrangement greatly simplifies the construction of such thermoplies with a concommitant reduction in the cost of assembly.

Figure 4:
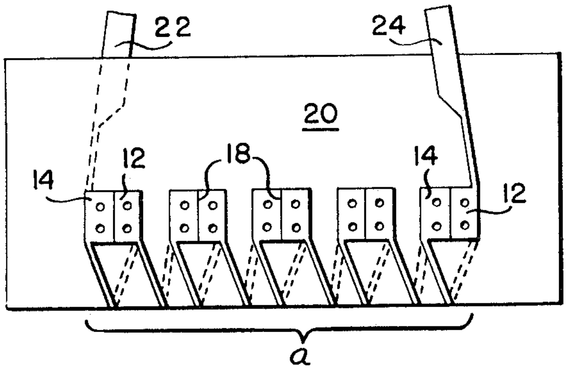
FIG. 4 is a plan view of the thermal apparatus of FIG. 1 showing the lower thermoelectric junctions folded over a sheet of insulating material.

Looking at FIGS. 1 and 4, it can be seen that there are 11 thermoelectric elements which form 10 thermoelectric junctions. When these elements are folded, as shown in FIG. 4, five series-connected differential thermocouples are formed with the thermoelectric junctions alternating both physically and electrically. In general terms, the plural junction thermal apparatus of the present invention can be described as having $n$, unitary planar thermoelectric elements arranged to form $n-1$ thermoelectric junctions where the number of elements "$n$" is an odd number of five or more.

The single-fold construction illustrated in FIG. 4 produces a compact, substantially planar thermopile. The thermoelectric e.m.f. of the thermopile is taken from output tabs 22 and 24 which, preferably, are integrally formed in the two end thermoelectric elements 12. Suitable wire leads, not shown, can be attached to the tabs 22 and 24 by conventional methods including soldering and fusion or spot welding.

The thermoelectric elements 12 and 14 are normally adhesively bonded to the thermal barrier 20. A variety of high-temperature adhesives can be used including, epoxies, phenolics, silicons and polyimides. Preferably, one or more apertures 26 are provided in each thermoelectric portion, 12*a*, *b* and 14*a*, *b* of the thermoelectric elements to improve the bonding. Looking at the cross-sectional view of FIG. 5, it can be seen that the adhesive 28 penetrates through the aperture 26 to ensure a tight bond between the elements 12 and 14 and the thermal barrier 20. The outer surface of each thermoelectric element is bonded by the adhesive 28 to an electrically insulative protective cover sheet 30. The cover sheet can be formed from a variety of materials including polymide films, adhesive-impregnated glass paper, and films sold by E. I. DuPont de Nemours under the trade names "KAPTON" and "MYLAR."

Higher thermoelectric junction density per sensor unit area can be achieved by using other physical configurations. One such configuration illustrated in FIG. 6 which depicts a 10-thermocouple unit. In accordance with the above-stated formula, the number of thermoelectric elements is 21 giving 20 thermoelectric junctions ($n$=21, $n-1$=20).

The 10-thermocouple unit illustrated in FIG. 6 is produced by double folding along the dashed fold lines identified in the drawing as Fold I and Fold II. For purposes of clarity the thermal barrier 20 and cover sheets 30 have been omitted from the Figure. However, it will be understood that the folds would usually be made around the parallel edges of the thermal barrier. In other words, the dashed fold lines also represent the edges of the thermal barrier.

When the lower group of thermoelectric elements is folded at fold line 01, the thermoelectric elements 12*b* and 14*b* which form thermoelectric junctions 18 will overlie the corresponding elements 12*a* and 14*a* which form junctions 16. Similarly, when fold 02 is made the upper group of thermoelectric elements which form junctions 18 will overlie the corresponding elements which form junctions 16, thus producing 10 series-connected, differential thermocouples in a relatively small area with a thin profile. It will be appreciated that in contrast to the folded structure shown in FIG. 4, the thermoelectric junctions 16 and 18 which form each differential thermocouple are electrically alternating, but not physically alternating.

Having described in detail the preferred embodiment of my invention, it will now be apparent that numerous modifications can be made without departing from the scope of the present invention as claimed in the following claims:

What I claim is:

1. A thermal apparatus comprising:

a plurality of unitary thermoelectric elements each having first and second planar thermoelectric portions and an intermediate connecting portion; means for connecting said elements in series to form a plurality of electrically alternating plus-to-minus and minus-to-plus thermoelectric junctions; and, planar thermal barrier means having at least on straight edge, said thermoelectric element connecting portions being single, flat folded around the straight edge of said thermal barrier means with said plus-to-minus and minus-to-plus thermoelectric junctions positioned in superposed, paired relation on opposite side of said planar thermal barrier and with the superposed thermoelectric portions of each pair of thermoelectric junctions comprising dissimilar thermoelectric materials.

2. The thermal apparatus of claim 1 wherein said first and second thermoelectric portions are offset in opposite directions from the axis of said connecting portion.

3. The apparatus of claim 1 wherein said means for connecting said thermoelectric elements comprises a plurality of edge welds.

PO-1050
(5/69)

UNITED STATES PATENT OFFICE
CERTIFICATE OF CORRECTION

Patent No. 3,607,445 Dated September 21, 1971

Inventor(s) FRANK F. HINES

It is certified that error appears in the above-identified patent and that said Letters Patent are hereby corrected as shown below:

Column 2, line 26, "untiary" should be --unitary--;

line 51 "12a-14" should be --12a-14a-- line 69, "0.002" should be --.0002--.

Column 4, line 1 insert the word "is" between the words configuration and illustrated line 14, "01" should be -- #1--;

line 17, "02" should be -- #2--.

Signed and sealed this 21st day of March 1972.

(SEAL)
Attest:

EDWARD M.FLETCHER,JR.
Attesting Officer

ROBERT GOTTSCHALK
Commissioner of Patents